United States Patent [19]

von der Ohe et al.

[11] Patent Number: 4,457,537
[45] Date of Patent: Jul. 3, 1984

[54] INDEPENDENT WHEEL SUSPENSION

[75] Inventors: Manfred von der Ohe, Stuttgart; Helmut Flemming, Hochdorf, both of Fed. Rep. of Germany

[73] Assignee: Daimler-Benz Aktiengesellschaft, Fed. Rep. of Germany

[21] Appl. No.: 333,997

[22] Filed: Dec. 23, 1981

[30] Foreign Application Priority Data

Dec. 23, 1980 [DE] Fed. Rep. of Germany ....... 3048837

[51] Int. Cl.³ .............................................. B60G 3/00
[52] U.S. Cl. .................................... 280/675; 280/690; 280/661
[58] Field of Search ................ 280/93, 96.1, 675, 690, 280/700, 701, 673, 661

[56] References Cited

U.S. PATENT DOCUMENTS

| 3,189,118 | 6/1965 | Arning | 280/701 |
| 3,871,467 | 3/1975 | Senft | 280/701 |
| 3,876,029 | 4/1975 | von der Ohe | 280/690 |
| 4,313,619 | 2/1982 | Hailer | 280/675 |

FOREIGN PATENT DOCUMENTS

| 817244 | 7/1959 | United Kingdom . |
| 1267838 | 3/1972 | United Kingdom . |
| 1360369 | 7/1974 | United Kingdom . |
| 2030940 | 4/1980 | United Kingdom . |
| 2038734 | 7/1980 | United Kingdom . |

Primary Examiner—Bruce H. Stoner, Jr.
Assistant Examiner—John A. Carroll
Attorney, Agent, or Firm—Craig & Burns

[57] ABSTRACT

An independent wheel suspension for motor vehicles, with the wheel suspension including a wheel carrier supported relative to a vehicle body by guide elements which determine an upper and lower guide point for the wheel carrier with respect to lateral forces. At least one of the guide points is elastically movable in a transverse direction relative to the vehicle body, with the guide points together fixing a vertical first pivot axis for the wheel carrier. The carrier furthermore is supported by a transversely extending track rod offset laterally, as seen in a side view of the wheel suspension. Under the influence of lateral forces, the upper guide point is displaceable outwards relative to the lower guide point and a second pivot axis, determined by the lower guide point and the articulation point of the track rod on the wheel carrier extends, in a side view, obliquely forwardly and upwardly, with respect to the normal driving direction of the vehicle, so as to enable an adjustment of the wheel suspension in a toe-in direction. The second pivot axis may also extend, in a side view, upwardly and obliquely rearwardly, with respect to the normal driving direction of the vehicle, for enabling an adjustment of the wheel suspension in a toe-out direction.

12 Claims, 4 Drawing Figures

INDEPENDENT WHEEL SUSPENSION

BACKGROUND OF THE INVENTION

The present invention relates to a wheel suspension arrangement and, more particularly, to an independent wheel suspension for passenger motor vehicles. The wheel suspension includes a wheel carrier supported relative to a vehicle body through guide elements which determine, with respect to lateral forces, an upper and lower guide point for the wheel carrier. At least one of the guide points being elastic in a transverse direction relative to the vehicle body. The upper and lower guide points together fix a vertical first pivot axis for the wheel carrier and the wheel carrier is supported about a transversely extending track rod which, in a side view, is laterally offset.

A wheel suspension of the aforementioned type is proposed in, for example, German Auslegeschrift No. 1,903,640, wherein an upper guide element formed by a shock absorber strut, is connected to the wheel carrier and forms an upper guide point which, in turn, is supported on the vehicle body by an elastic articulation means. A lower guide element, formed by a half shaft of the axle arrangement mounted on the wheel carrier, is inflexibly supported in a transverse direction with respect to a differential gear of the vehicle axle arrangement. A track rod is articulated to the wheel carrier so as to be, in a side view, rearwardly offset. A wishbone arm for providing longitudinal guidance extending obliquely forwardly, as viewed in a normal driving direction of the vehicle, is provided with a spring means being supported on the wishbone arm.

Typically, a shock absorber strut is articulatingly connected to the vehicle body, with a point of articulation being elastically flexible but virtually rigid with respect to forces resulting from the application of a lateral force. A bearing of the respective half shafts in a wheel carrier forms the guide points for determining a first pivot axis which extends essentially vertically in a transversely extending wheel center plane. Lateral forces are exerted at a position rearwardly offset with respect to the first pivot axis and are absorbed through the track rod which is also rearwardly offset. The elasticities provided in the support for the track rod relative to the vehicle body and/or wheel carrier lead to the wheel carrier, together with the wheel attached thereto, being pivoted in a toed out direction under the influence of lateral forces. This, as a rule, is undesirable, particularly for rear wheels of passenger motor vehicles, since the suspension for the rear wheels is generally constructed with a view toward understeering in cornering of the vehicles which is conventional in passenger motor vehicles designed for comfort.

To achieve a pivoting in a toe-in direction under an influence of lateral force, it has been proposed to arrange a pivot axis determined by the guide points so that the axis pierces a wheel contact plane behind a point of engagement of the lateral force, as seen from the side. However, especially in view of the elasticity of the wheel suspension, the locating of the pivot axis in this proposed manner by no means always leads to the desired result and, consequently, there are a number of compromises especially for production vehicles designed for the greatest possible driving comfort in order, on the one hand, to achieve the sought after driving comfort at least approximately through the appropriate elastic mounting means in the wheel suspension and, on the other hand, to guarantee a satisfactory handling characteristic along with the necessary driving safety. However, the same type of suspension is frequently employed not only for production vehicles designed for comfort but also for sports vehicles for which relatively low comfort standards are required. Additionally, it may be desirable to provide a motor vehicle having a chassis construction which is more of a sporting version and, in which case, perhaps cornering behavior of the vehicle with a tendency to oversteer may sometimes be required for such chassis construction. However, the change requirements for the various types of chassis for a sport version vehicle and a production vehicle constructed for comfort generally necessitate relatively considerable modifications for the wheel suspension.

SUMMARY AND OBJECTS OF THE INVENTION

The aim underlying the present invention essentially resides in providing a wheel suspension arrangement for a passenger motor vehicle which suspension arrangement is adapted to be influenced, with respect to lateral forces, in such a manner that tendencies of the wheel suspension arrangement to desirable track changes in a toe-in or toe-out direction, both for different basic constructions and for compensation of effects which arise, for example, as a result of increasing the elasticity in the mounting means of the suspension arrangement, in order to achieve a greater driving comfort.

In accordance with the present invention, a wheel suspension arrangement is provided which, under the influence of lateral forces, has an upper guide point which may be outwardly displaced, with respect to a transverse direction of the vehicle, relative to a lower guide point. A second pivot axis is provided which is determined by the lower guide point and an articulation point of the track rod on the wheel support located, in a side view, in such a manner that the pivot axis extends obliquely forwardly and upwardly or obliquely forwardly and downwardly, depending on whether an adjustment in a toe-in direction or toe-out direction made. In conjunction with these features, a position of the first pivot axis in front of or behind a transversely extending wheel center plane, with respect to a piercing point through the wheel plane, proves advantageous for the toe-out and toe-in, respectively, track changes.

By virtue of the features of the present invention, it is possible, in an outstanding manner with only slight changes, to influence the handling characteristics of the motor vehicle in many ways and, especially when applied simultaneously to front and rear wheels of a vehicle. The present invention provides the possibility of adapting a chassis of the entire motor vehicle to oversteer or understeer with relatively simple means and changes.

An advantage of the present invention resides in the fact that the ability to determine the adaptaion of the chassis to oversteer or understeer or the influence on a tendency towards toe-in or toe-out alignment, by recourse to the pivotal movement of the wheel about the second pivot axis, offers an additional possible means for influencing the suspension arrangement which is particularly important when one considers the extremely laborious and expensive fine adjustments of the vehicle chassis, which involves the use of a large number of elastic attachment or mounting means which are difficult to control.

Yet another advantage of the present invention resides in the fact that guide elements of the most diverse type may be readily used and the suspension arrangement of the present invention may, for example, be utilized in spring strut and shock absorber axles, double wishbone type axles, as well as with axles provided with guide links divided into a number of individual single links.

It is also possible in accordance with the present invention, in order to extend the constructional possibilities of the suspension arrangement even further, to provide a plurality of guide links, each of which is divided into single links, with the respective links being guided on the vehicle at ideal or optimum guide points.

In accordance with the present invention, the second pivot axis pierces or extends through a wheel contact plane at a position behind a piercing point of the first pivot axis. An articulation point of the track rod is, as viewed in a side view, disposed higher than the lower guide point and offset forwardly, as viewed in a normal driving direction of the vehicle.

It is also possible in accordance with the present invention, for the articulation point of the track rod to be located, in a side view, at a position lower than the lower articulation point of the wheel suspension and offset rearwardly, with respect to the lower articulation point, as viewed in a normal driving direction of the vehicle.

In accordance with still further features of the present invention, a second pivot axis, determined by the lower guide point and articulation point of the track rod on the wheel carrier extends, in a side view, obliquely rearwardly and upwardly with respect to the normal driving direction of the vehicle with the second pivot axis being provided for enabling an adjustment of the wheel suspension in a toe-out direction.

The second pivot axis may, in accordance with the present invention, pierce the wheel contact plane at a position forwardly of the wheel center plane with the second pivot axis piercing the wheel contact plane forwardly of the first pivot axis.

Advantageously, the articulation point of the track rod may, in a side view, be disposed higher than a lower articulation point and offset rearwardly, as viewed in a normal driving direction of the vehicle, or the articulation point of the track rod may be located, in a side view, lower than the lower articulation point and offset forwardly with respect to the lower articulation point, as viewed in a longitudinal direction of the vehicle.

Accordingly, it is an object of the present invention to provide an independent wheel suspension for motor vehicles which avoids, by simple means, shortcomings and disadvantaged encountered in the prior art.

Another object of the present invention resides in providing an independent wheel suspension for motor vehicles which is simple in construction and therefore relatively inexpensive to manufacture.

Yet another object of the present invention resides in providing an independent wheel suspension for motor vehicles, especially passenger motor vehicles, which enables the attainment of a maximum driving comfort while nevertheless guaranteeing satisfactory handling characteristics and driving safety.

A still further object of the present invention resides in providing a wheel suspension for motor vehicles which is readily adapted to be employed in production vehicles constructed for the greatest possible driving comfort as well as sports vehicles with a minimum amount of modification.

A still further object of the present invention resides in providing a wheel suspension for passenger motor vehicles which may be readily adaptable to enable the entire vehicle to oversteer or understeer.

Yet another object of the present invention resides in providing a wheel suspension for passenger motor vehicles which functions reliably under all load conditions of the vehicle.

These and other objects, features, and advantages of the present invention will become more apparent from the following description when taken in connection with the accompanying drawing which shows, for the purposes of illustration only, several embodiments in accordance with the present invention, and wherein:

DESCRIPTION OF THE PREFERRED EMBODIMENTS

Figure 1:
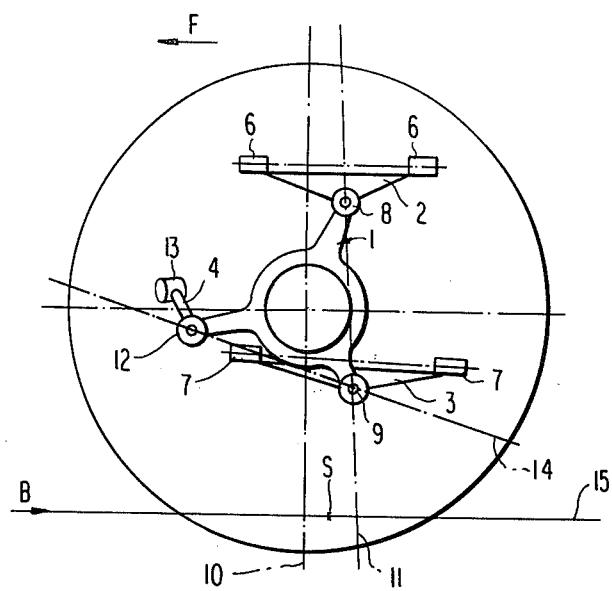
FIG. 1 is a partially schematic side view of a wheel suspension for passenger motor vehicles constructed in accordance with the present invention.

Referring now to the drawings wherein like reference numerals are used throughout the several views to designate like parts and, more particularly, to FIG. 1, wherein according to this figure, an independent wheel suspension includes a wheel carrier generally designated by the reference numeral 1, with the wheel carrier being supported relative to a body (not shown) of the vehicle by way of guide elements such as, for example, an upper wishbone 2, a lower wishbone 3, and a track rod 4. In FIG. 1, the upper and lower wishbones 2, 3 are schematically illustrated as triangular shaped wishbones which are secured or fastened, in a conventional manner, to the vehicle body by bearings 6, 7, respectively. The upper and lower wishbones 2, 3 are articulated on the wheel carrier 1 by guide points 8, 9. The guide points 8, 9 are disposed behind a transversely extending center plane 10 of the wheel, as viewed in a normal driving direction F of the vehicle. The guide points 8, 9 determine a first pivot axis 11 which extends essentially parallel to the transversely extending wheel center plane 10, in the illustrated side view.

The track rod 4 is articulated to the wheel carrier 1 at a position forwardly of the transversely extending wheel center plane 10, as viewed in the normal driving direction F, with the track rod 4 being connected to the wheel carrier 1 at an articulation point 12. The track rod 4 is articulated with respect to the vehicle body by way of a suitable bearing 13.

In the embodiment of FIG. 1, the guide points 8, 9 as well as the articulation point 12 are each formed by ball and socket joints. The guide point 9 on the lower wishbone 3 of the wheel carrier 1 and the articulation point 12 of the track rod 4 at the wheel carrier 1 determines a second pivot axis 14 which, in a side view, ascends obliquely forwardly, as viewed in the normal driving direction F.

With sports type vehicles, the bearings 6, 7 of the wishbones 2, 3 and bearing 13 of the track rod 4 are, in a conventional manner constructed so as to be very hard, with the effect being that both the longitudinal and lateral forces would have practically no influence on the wheel guide kinematics fixed by the wishbones 2, 3 and the track rod 4. However, such a kinematically exact guidance of the wheel carrier 1 and consequently, of the wheel associated therewith, is not practical for conventional production vehicles which are designed to have maximum comfort. Consequently, with the conventional production vehicle, at least the bearings on the vehicle body side are, in a conventional manner, fashioned so as to be elastically resilient by virtue of the interposition of appropriate elastic mounting or supporting means.

If it is assumed that a greater elasticity is provided in a transverse direction of the vehicle through the bearings 6 and/or 7, then movement caused by the elasticity of the bearings are superimposed on the exact kinematics of the guidance or suspension system. For example, upon the application of a longitudinal force B exerted as, for example, a braking force, the result would be that, for example, because of the torque about the vertical axis caused by the force B, whichever bearings 6 or 7 are in front, with respect to the normal driving direction F, would be displaced slightly outwardly from the center of the vehicle; while the bearing 6 or 7 at the rear, again as viewed in the normal driving direction F, would be shifted toward the center of the vehicle. The guide points 8, 9 determining the first pivot axis 11 would accordingly be displaced and the wheel carrier 1 would be twisted slightly about the pivot axis 11 through the track rod 4. With the arrangement or disposition of the track rod 4 in the position illustrated in FIG. 1, the wheel carrier 1 could thereby be kept at least virtually neutral with respect to a toe-in direction under the influence of the longitudinal force depending upon the amount of elasticity desired or provided in the bearing 13.

When, in the wheel suspension of FIG. 1, the influence of a lateral force such as a force which is known to be exerted during a cornering of the motor vehicle at a point S slightly behind the transversely extending wheel center plane 10 is considered, it must first be assumed that a force directed toward the center of the vehicle is exerted at the guide point 9, while a force directed away from the center of the vehicle is effective at the guide point 8. Depending upon a position and adjustment of the track rod and the hardness of the bearing 13, the displacement of the wheel carrier 1 in a transverse direction of the vehicle, which is caused thereby, may lead to the wheel carrier or the wheel tending to deviate in a toe-out direction although, in the indicated position of the pivot axis 11, a pivoting in the toe-in direction would have to occur due to the lateral force.

If, for example, there is a tendency in the wheel suspension in accordance with a basic principle of the present invention, caused by the elasticities and guidance kinematics, the tendency can be countered by utilizing, in conjunction with the elastic nature of the mounting means, a pivotability about the second pivot axis 14 in order to counteract this tendency.

The second pivot axis 14 is determined by the guide point 9 of the lower wishbone 3 for the wheel carrier 1 and the articulation point 12. For the purpose of exerting an influence in a toe-in direction, the second pivot axis 14 is arranged so as to extend obliquely forwardly and upwardly, as viewed in the normal driving direction F of the vehicle. The second pivot axis is disposed so that it pierces the wheel contact plane 15 at a position behind the transversely extending center plane of the wheel. By providing mounting means having a predetermined elasticity so as to enable the upper guide point 8 to travel outwardly relative to the lower guide point 9 under the influence of a lateral force, there thus arises for the wheel and wheel carrier 1 a pivoting movement about the second pivot axis 14 which tends to lead in a toe-in direction for alignment of the wheel.

Figure 3:
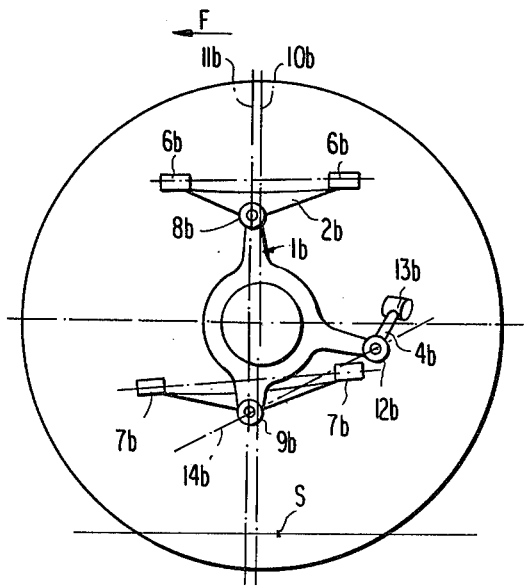
FIG. 3 is a partially schematic side view of a further embodiment of a wheel suspension for a passenger motor vehicle constructed in accordance with the present invention.

An opposite effect may also be achieved by an appropriate adjustment. The wheel suspension of FIG. 3 shows an embodiment for enhancing the tendencies desired or compensating undesirable tendencies as the case may be. This would be especially important for carrying out a fine adjustment in vehicles so that, for example, while essentially maintaining the desired kinematics, both the front axle and rear axle could be influenced and thereby coordinated with one another so that oversteer or understeer tendencies may be impressed on the vehicle.

The wheel suspension of FIG. 1 represents, to that extent, a solution which permits a toeing-in of the wheel of the vehicle under the influence of lateral forces. In this case, it must first be assumed that at least the bearings 6 and/or 7 and, preferably, also the bearing 13 have sufficiently great elasticity in a transverse direction. Also, the pivot axis 11 must be offset rearwardly relative to the transversely extending wheel center plane 10 until the point S of engagement of the lateral force is located in front of the first pivot axis 11, as viewed in the normal driving direction F of the vehicle. This would be enough to provide a certain tendency for adjustment in the toe-in direction under the influence of a lateral force. However, the hardness of the bearings 6 and 7 may also be matched to one another so that, under the influence of the lateral force, the guide point 8 travels outwardly relative to the guide point 9 thereby causing the wheel to execute an additional pivoting movement about the axis 14, in which the lower part of the wheel pivots inwardly as a result of which there is a tendency to change in a toe-in direction.

Figure 2:
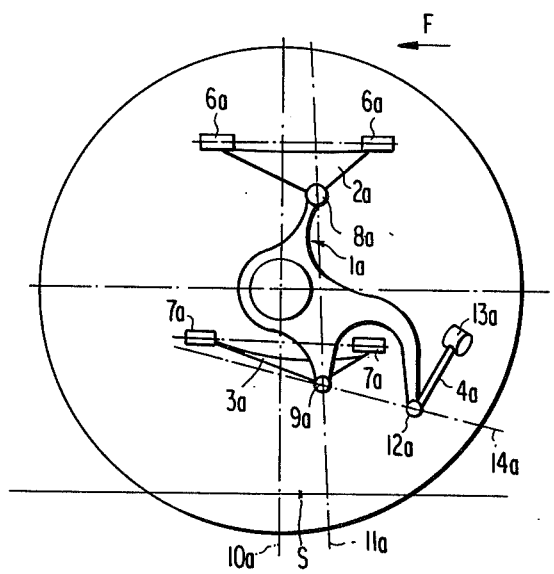
FIG. 2 is a partially schematic side view of another embodiment of a wheel suspension for passenger motor vehicles constructed in accordance with the present invention.

In the embodiment of FIG. 2, the same conditions or principles apply as with the embodiment of FIG. 1 and, according to FIG. 2, a position of a second pivot axis 14a is approximately the same; however, a track rod 4a is located behind the transversely extending wheel-center plane 10a. Accordingly, an articulation point 12a is also located behind the transversely extending wheel center plane 10a and behind the guide point 9a, as viewed in a normal driving direction F of the vehicle.

In contrast to FIG. 2, FIG. 3 provides an example of a construction for influencing a tendency of the suspension arrangement toward a toe-out direction. For this purpose, a pivot axis 14b is arranged so as to extend obliquely forwardly and downwardly, as viewed in the normal driving direction F. The construction may be realized by disposing the articulation point 12b of a track rod 4b above, and, with respect to the driving direction F, behind the guide point 9b. However, in a manner similar to that of FIG. 2, the track rod 4b could also be located on the opposite side of the transversely extending center plane 10b of the wheel provided that the articulation point 12b is placed precisely so that an appropriate position of the pivot axis 14b is maintained in conjunction with the articulation point 9b and the elastic mounting means noted above.

Figure 4:
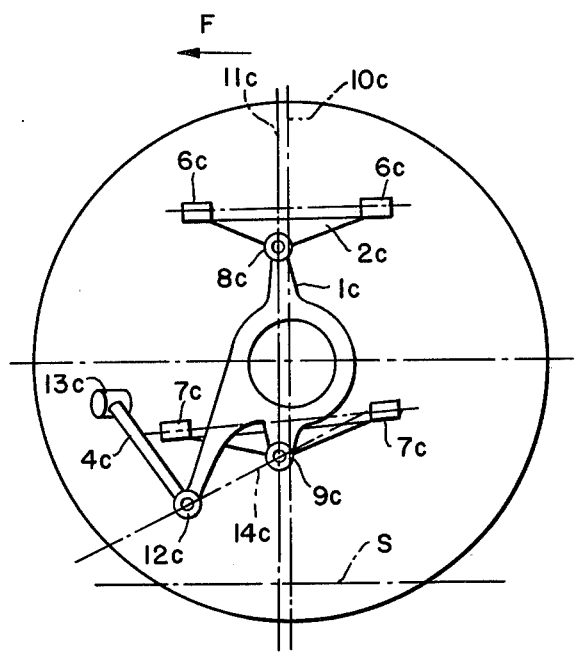
FIG. 4 is a partially schematic side view of yet another embodiment of a wheel suspension for a passenger motor vehicle constructed in accordance with the present invention.

The embodiment as depicted in FIG. 4 provides an example somewhat similar to the construction of the embodiment shown in FIG. 3 in that a pivot axis 14c is arranged so as to extend obliquely forwardly and downwardly, as viewed in the normal driving direction F. In this arrangement the articulation point 12c of a track rod 4c is disposed at a position lower than and offset forwardly of the lower guide point 9c, with respect to the driving direction F. As in FIG. 3, the bearings 7c determine an axis which, like the pivot axis 14c, extends obliquely forwardly and downwardly as viewed in the normal driving direction F, but with a lesser degree of divergence. As in FIG. 2, the end of the track rod 4c, having a bearing 13c associated therewith is disposed below a horizontal plane extending through the center of the wheel carrier 1c. Of critical importance in this embodiment, as in the other embodiments, is the precise positioning of the articulation point 12c so that an appropriate position of the pivot axis 14c is maintained in conjunction with the articulation point 9c and the elastic mounting means.

While, for the sake of simplicity, a construction of the wishbones is of the A-type frame, as can readily be appreciated, the wishbones 2, 3 may also be divided and formed, for example, by single links which each engage at two points on the wheel carrier 1, so that ideal guide points may be obtained. It is also possible, when utilizing the wheel suspension constructed as a shock absorbing axle or spring strut axle, for the upper guide point to be formed by an upper articulation point of the shock absorber or spring strut provided that the upper articulation point of the shock absorber core and/or its lower guide element have a sufficiently great transverse movability.

If the wheel suspension of the present invention is utilized for front axles, then the track rod is a part of the steering linkage and the fundamental possibilities indicated hereinabove will not as a result thereof be impaired.

With the embodiment of FIG. 1, the track rod 4 is located forwardly, as viewed in the driving direction F, of the transversely extending wheel center plane 10, with the articulation point on the wheel carrier 1 determining a pivot axis together with the corresponding articulation point of the lower wishbone 2. In contrast, FIG. 2 provides the articulation point of the lower wishbone 3 on the wheel carrier 1 and the articulation point of the track rod 4a on the wheel carrier 1 to be located behind the transversely extending wheel center plane 10 so that, as with the construction of FIG. 1, a pivot axis is obtained which ascends in the driving direction F of the vehicle. In contradistinction to the constructions of FIGS. 1 and 2, FIG. 3 provides a wheel suspension wherein the pivot axis extends obliquely forwardly and downwardly with respect to the driving direction F of the vehicle.

While we have shown and described several embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompasses by the scope of the appended claims.

We claim:

1. An independent wheel suspension for motor vehicles, the wheel suspension comprising wheel carrier means for supporting a wheel, guide means for supporting the wheel carrier means relative to a body of the vehicle, means provided on the guide means for defining an upper and lower guide point for the wheel carrier with respect to lateral forces, means for mounting at least one of the upper and lower guide points so as to be elastically movable in a transverse direction with respect to the vehicle body, the upper guide point and lower guide point determining a generally vertically extending first pivot axis for the wheel carrier means, and a track rod means extending transversely of the vehicle and adapted to be connected to the wheel carrier means and the body of the vehicle, said track rod offset relative to said first pivot axis, said upper guide point is mounted so as to be displaced outwardly relative to the lower guide point under an influence of a lateral force on the wheel directed generally transversely of the vehicle and below the lower guide point, the lower guide point and a point of articulation of the track rod means at the wheel carrier means define a second pivot axis for enabling an adjustment of the wheel suspension in a toe-in direction, said second pivot axis, in a side view of the wheel suspension, extends upwardly and obliquely forwardly, relative to the normal driving direction of the vehicle.

2. An independent wheel suspension according to claim 1, wherein the second pivot axis intersects a wheel contact plane at a position rearwardly of a transversely extending center plane of the wheel, as viewed in a normal driving direction of the vehicle.

3. An independent wheel suspension according to one of claims 1, or 2, wherein the second pivot axis intersects the wheel contact plane at a position rearwardly of a point of intersection of the first pivot axis with the wheel contact plane.

4. An independent wheel suspension according to claim 3, wherein the point of articulation of the track rod means at the wheel carrier means, in a side view of the wheel suspension, is disposed at a position higher than the lower guide point and offset forwardly, as viewed in the normal driving direction of the vehicle, with respect to the lower guide point.

5. An independent wheel suspension according to one of claims 1, or 2, wherein the point of articulation of the track rod means at the wheel carrier means is disposed, in a side view of the wheel suspension, at a position lower than the lower guide point and offset rearwardly, as viewed in a normal driving direction of the vehicle, with respect to the lower guide point.

6. An independent wheel suspension according to one of claims 1, or 2, wherein the point of articulation of the track rod means at the wheel carrier means, in a side view of the wheel suspension, is disposed at a position higher than the lower guide point and offset forwardly as viewed in the normal driving direction of the vehicle, with respect to the lower guide point.

7. An independent wheel suspension according to claim 1, wherein the second pivot axis intersects a wheel contact plane at a position rearwardly of a transversely extending center plane of the wheel, as viewed in a normal driving direction of the vehicle.

8. An independent wheel suspension for motor vehicles, the wheel suspension comprising wheel carrier means for supporting a wheel, guide means for supporting the wheel carrier means relative to a body of the vehicle, means provided on the guide means for defining an upper and lower guide point for the wheel carrier with respect to lateral forces, means for mounting at least one of the upper guide point and lower guide point so as to be elastically movable in a transverse direction with respect to the vehicle body, the upper guide point and lower guide point determining a generally vertically extending first pivot axis for the wheel carrier means, and track rod means extending transversely of the vehicle and adapted to be connected to the wheel carrier means and the body of the vehicle, said track rod offset relative to said first pivot axis, said upper guide point is mounted so as to be displaced outwardly relative to the lower guide point under an influence of a lateral force on the wheel directed generally transversely of the vehicle and below the lower guide point, the lower guide point and point of articulation of the track rod means at the wheel carrier means define a second pivot axis for enabling an adjustment of the wheel suspension in a toe-out direction, said second pivot axis, in a side view of the wheel suspension extends upwardly and obliquely rearwardly, relative to the normal driving direction of the vehicle.

9. An independent wheel suspension according to claim 8, wherein the second pivot axis intersects a wheel contact plane at a position forwardly of a center plane of the wheel, as viewed in a normal driving direction of the vehicle.

10. An independent wheel suspension according to claim 9, wherein the second pivot axis intersects the wheel contact plane at a position forwardly of a point of intersection of the first pivot axis with the wheel contact plane, as viewed in a normal driving direction of the vehicle.

11. An independent wheel suspension according to claim 9, wherein the point of articulation of the track rod means is, in a side view of the wheel suspension, disposed at a position higher than the lower guide point and offset rearwardly, as viewed in a normal driving direction of the vehicle, with respect to the lower guide point.

12. An independent wheel suspension according to claim 8, wherein the articulation point of the track rod means is, in a side view of the wheel suspension, disposed at a position lower than the lower guide point and offset forwardly, as viewed in a normal driving direction of the vehicle, with respect to the lower guide point.

* * * * *